US011518859B2

(12) United States Patent
    Aronoff

(10) Patent No.: US 11,518,859 B2
(45) Date of Patent: *Dec. 6, 2022

(54) SURFACE PROTECTION ARTICLES AND METHODS

(71) Applicant: EJAA HOLDINGS INC., Westmount (CA)

(72) Inventor: Eric Aronoff, Westmount (CA)

( * ) Notice: Subject to any disclaimer, the term of this patent is extended or adjusted under 35 U.S.C. 154(b) by 509 days.

This patent is subject to a terminal disclaimer.

(21) Appl. No.: 16/373,837

(22) Filed: Apr. 3, 2019

(65) Prior Publication Data

US 2019/0309135 A1      Oct. 10, 2019

Related U.S. Application Data

(60) Provisional application No. 62/652,649, filed on Apr. 4, 2018.

(51) Int. Cl.
    *C08J 5/18*       (2006.01)
    *B29C 48/00*      (2019.01)
    (Continued)

(52) U.S. Cl.
    CPC .............. *C08J 5/18* (2013.01); *B05B 12/24* (2018.02); *B29C 48/022* (2019.02); *B60N 2/60* (2013.01);
    (Continued)

(58) Field of Classification Search
    CPC .... C08J 5/18; C08L 9/06; C08L 23/06; C08L 23/16; C08L 23/22; C08L 2205/08; B29K 2105/162
    See application file for complete search history.

(56) References Cited

U.S. PATENT DOCUMENTS 6,911,407 B2 *   6/2005  Sherrod ............... A47C 27/006
                                                    442/101
8,176,685 B2 *   5/2012  May ......................... B60N 2/60
                                                        52/3

(Continued)

OTHER PUBLICATIONS

Farkhondeh Hemmati et al., Effects of Organoclay on the Compatibility and Interfacial Phenomena of PE/EVA Blends with UCST Phase Behavior, Polymer Composites, 2014, p. 2329-2342. (Year: 2014).*

(Continued)

*Primary Examiner* — Nicholas E Hill
(74) *Attorney, Agent, or Firm* — Rosenberg, Klein & Lee

(57) ABSTRACT

Painting in commercial, residential, and retail environments requires extreme care to avoid paint being deposited where it is not required. Drop cloths are commonly used to protect a floor or furniture during the painting process. However, these are generally simply plastic sheets to provide a barrier to the liquid paint and nothing more. Accordingly, it would be advantageous to provide a drop sheet or tarp that supports a liquid material drying process such as by dehydration, coagulate, etc. or form solid materials thereby reducing the instances of subsequent paint transfer from the drop sheet or tarp directly or indirectly to other surfaces and/or objects. It would also be advantageous to drop sheet or tarp that provides a non-slip surface which prevents the drop sheet from sliding around and remains well in place without additional weights, tape, etc.

20 Claims, 7 Drawing Sheets

(51) Int. Cl.
  *C08L 9/06* (2006.01)
  *C08L 23/06* (2006.01)
  *C08L 23/16* (2006.01)
  *C08L 23/22* (2006.01)
  *B60N 2/60* (2006.01)
  *B05B 12/24* (2018.01)
  *B29K 105/16* (2006.01)
  *B29L 7/00* (2006.01)
  *A47G 27/02* (2006.01)

(52) U.S. Cl.
  CPC .................. *C08L 9/06* (2013.01); *C08L 23/06* (2013.01); *C08L 23/16* (2013.01); *C08L 23/22* (2013.01); *A47G 27/0206* (2013.01); *B29K 2105/162* (2013.01); *B29L 2007/002* (2013.01); *C08J 2309/06* (2013.01); *C08J 2323/06* (2013.01); *C08J 2323/16* (2013.01); *C08J 2323/22* (2013.01); *C08J 2409/06* (2013.01); *C08J 2423/06* (2013.01); *C08J 2423/16* (2013.01); *C08J 2423/22* (2013.01); *C08J 2433/02* (2013.01); *C08L 2205/025* (2013.01); *C08L 2205/03* (2013.01); *C08L 2205/08* (2013.01)

(56) References Cited

U.S. PATENT DOCUMENTS 9,482,022 B2 * 11/2016 Aronoff .................... B32B 5/02
2007/0275209 A1 * 11/2007 Netravali ........... A47G 27/0206
  428/99

OTHER PUBLICATIONS

A. Mengual, PE-g-MA, PP-g-MA and SEBS-g-MA Compatibilizers Used in Material Blends, 13 Procedia Manufacturing 321 (2017). (Year: 2017).*

* cited by examiner

SURFACE PROTECTION ARTICLES AND METHODS

CROSS-REFERENCE TO RELATED APPLICATIONS

This patent application claims the benefit of priority from U.S. Provisional Patent Application 62/652,649 filed Apr. 4, 2018 entitled "Surface Protection Articles and Methods", the entire contents of which are included herein by reference.

FIELD OF THE INVENTION

The present invention relates to surface protection articles and more specifically to drop cloths, drop sheets, and protective coverings for use during the application of surface coatings such as paints, lacquers, etc.

BACKGROUND OF THE INVENTION

Painting is the practice of applying paint, pigment, color or other medium to a surface (support base). The medium is commonly applied to the base with a brush, but other objects can be used including rollers and sprayers. Painting is also used to define a common trade among craftsmen and builders and amateur enthusiasts undertaking Do-It-Yourself (DIY). Irrespective of the medium and surface it is very difficult even for professional craftsmen to avoid a few drips and splatters on other surfaces, including floors and objects in the vicinity of the surface being painted. Occasionally, those drips and splatters can become a flood in cases where an entire can of paint is accidentally overturned or tipped. Accordingly drop cloths and tarps are used to provide protection for a variety of painting and sanding tasks to lay or drape over the surfaces and/or objects in order to protect them.

Within the prior art one of the first decisions a painter (also referred to as a painter decorator or decorator, DIYer) needs to make when searching for supplies to provide protection form paint spills and splatters etc. is how much painting they plan to do and where they'll be doing it. Drop cloths (cloths) and tarps can be made from different materials, each of which is generally better suited to certain situations than others. Some are disposable, making them ideal for quick, one-shot jobs while others will last for years. Typically, outdoor jobs will require stronger, more durable materials. Canvas cloths and tarps provide some absorbency for some or all of the constituents within the material being painted or applied to the surface and are more costly. Plastic and other non-absorbent tarps and substrates need to be handled carefully during cleanup to avoid spilling drops of paint that is still wet etc. onto the very surfaces and/or objects that the painter worked so hard to keep clean.

Drop cloths (and drop sheets as they are commonly and interchangeably referred to) can be made from a range of materials, including canvas, plastic, paper, vinyl sheeting, paper/plastic combinations (commonly referred to as paper/plastic), and cotton/plastic combinations (commonly referred to as laminated cotton/plastic). Plastic drop cloths are often referred to as a plastic runner and/or drop sheets and/or plastic sheeting. Canvas is a woven fabric that is not always lightweight but is durable and is often used by professional painters. Plastic sheeting is easy to tape down to walls and other surfaces in order to keep the sheet in place, to cover areas to keep clean and is also used to create temporary walls or barriers within areas being painted or to provide restricted areas when "spray painting". Which material the painter chooses depends on whether or not they want to be able to reuse the selected covering and whether they are working indoors or out. Table 1 below details some of the benefits and points to consider for each type of material commonly used for drop cloths or drop sheets.

TABLE 1

| | Benefits and Considerations for Different Cloth and Tarp Materials | |
|---|---|---|
| Material | Benefits | Points to Consider |
| Canvas | Absorbent<br>Reusable<br>Resists tears and punctures<br>Malleable<br>Droppable (drapable) | Butyl backing provides impenetrability<br>May be made from recycled cotton fabrics<br>Heavier weight and tighter weave provide greater protection<br>Generally more expensive |
| Paper | Economical but paint will soak through<br>Disposable<br>Absorbent | Not suitable for multiple uses<br>May tear or rip under light conditions<br>One time use |
| Paper/Plastic) | Economical<br>Disposable<br>Absorbent with protective layer<br>More impenetrable than paper alone | Not suitable for multiple uses<br>May tear or rip under light conditions<br>One time use |
| Plastic | Available in light, medium, heavy and extra-heavy weights<br>Heavy-duty plastic is rip-resistant<br>Waterproof<br>Economical Ideal for covering furniture and oddly shaped objects<br>Impenetrable<br>Temporary walls or barriers when spray painting | Lightweight plastic is ideal for indoor painting projects<br>Plastic may be used indoor and outdoor<br>Medium-weight plastic can be used indoors and out<br>Extra-heavy (referred to as tarp weight) weight plastic may protect against chemical solvents within paint<br>Doesn't absorb paint<br>Weigh down edges when working outside to avoid plastic blowing away |

TABLE 1-continued

Benefits and Considerations for Different Cloth and Tarp Materials

| Material | Benefits | Points to Consider |
| --- | --- | --- |
|  |  | May be cut or punctured<br>Sheets with textured designs contain paint spills better<br>Paint remains wet on surface |

Tarps are often constructed from heavy-gauge polyethylene and are both waterproof and weather-resistant and generally feature grommets around the edges allowing tie ropes or bungee cords to be inserted to make using tarps for transporting allowing them to be tied down when painting outside. Tarps can range from fairly small (6'×8') to large (20'×30'). Coated reinforced plastic tarps combine the impermeability of disposable plastic with the durability of canvas. Textured surfaces may minimize the danger of slipping especially on polyethylene tarps.

However, paint once dropped, dripped, or spilt onto a drop cloth or tarp still presents an issue to painters in that it may be further dripped or spilt onto the surfaces and/or objects being protected when the painter goes to move or remove the drop cloth or tarp. Likewise, when the drop cloth or tarp is on the floor then wet paint gets picked up on the shoes or feet of the painter, other individuals in the area, and animals wherein it is then re-deposited onto the floor in areas not protected by the drop cloth or tarp. These instances arise as the paint or other materials being painted take time to dry. Further, where the paint is thick, such as in a paint drop or spill, then unlike the surface being painted where the paint dries completely the paint drop or spill has a "skin" formed where the surface dries out but beneath this "skin" there is liquid paint.

At the same time drop cloths or tarps are prone to slipping, sliding, nicking up, and other motions that can result in the surface or surfaces being protected becoming exposed and unprotected without the decorator, handyman, contractor being aware such that the material or materials being applied in liquid form can drip, splash, etc. onto what was supposed to be a protected surface.

Additionally, dried paint etc. on a plastic drop sheet or tarp does not adhere well such that subsequent rolling, folding, creasing, etc. of the plastic drop sheet or tarp results in results in paint flaking and creates messy dried paint shards. Dried Paint being detached and either creating a mess in the work area or worse getting attached to either the applicator applying the liquid material or to the surrounding surfaces that are still wet or tacky.

Accordingly, it would be beneficial to provide a drop sheet or tarp that provides increased friction against the surfaces onto which it is deployed.

Accordingly, it would be further beneficial to provide a drop sheet or tarp that provides for increased adhesion of drying, curing, dried and/or cured liquids to reduced subsequent detachment etc.

Accordingly, it would be further beneficial to provide a drop sheet or tarp that supports a liquid material drying process such as by dehydration, coagulate, etc. or form solid materials thereby reducing the instances of subsequent paint transfer from the drop sheet or tarp directly or indirectly to other surfaces and/or objects.

Accordingly, it would be further beneficial to provide a drop sheet or tarp that includes the above features and combines them with a designated non-slip surface which prevents the drop sheet from sliding around and remains well in place without additional weights or tape to keep it in place resulting in added security for keeping ladders, stools and other mountables from sliding about in addition to having the sheet be non-slip while walking upon it.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate disadvantages of the prior art and provide improvements to the painting industry and more specifically to the provisioning of surface protection articles and more specifically to drop cloths, drop sheets, and protective coverings for use during the application of surface coatings such as paints, lacquers, etc.

In accordance with an embodiment of the invention there is provided a method comprising:
providing a flexible substrate having lateral dimensions substantially larger in each direction than its thickness and having a top surface and a bottom surface; wherein
the flexible substrate is formed from a single layer of a polymer blend comprising at least two polymeric materials;
a first polymeric material of the at least two polymeric materials supports adhesion of a solidified form of a liquid employed in coating surfaces; and
a second polymeric material of the at least two polymeric materials supports adhesion of the flexible substrate to a surface upon which it is deployed.

In accordance with an embodiment of the invention there is provided a sheet comprising:
a flexible substrate having lateral dimensions substantially larger in each direction than its thickness and having a top surface and a bottom surface; wherein
the flexible substrate is formed from a single layer of a polymer blend comprising at least two polymeric materials;
a first polymeric material of the at least two polymeric materials supports a first aspect of the performance of the sheet; and
a second polymeric material of the at least two polymeric materials supports a second aspect of the performance of the sheet.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
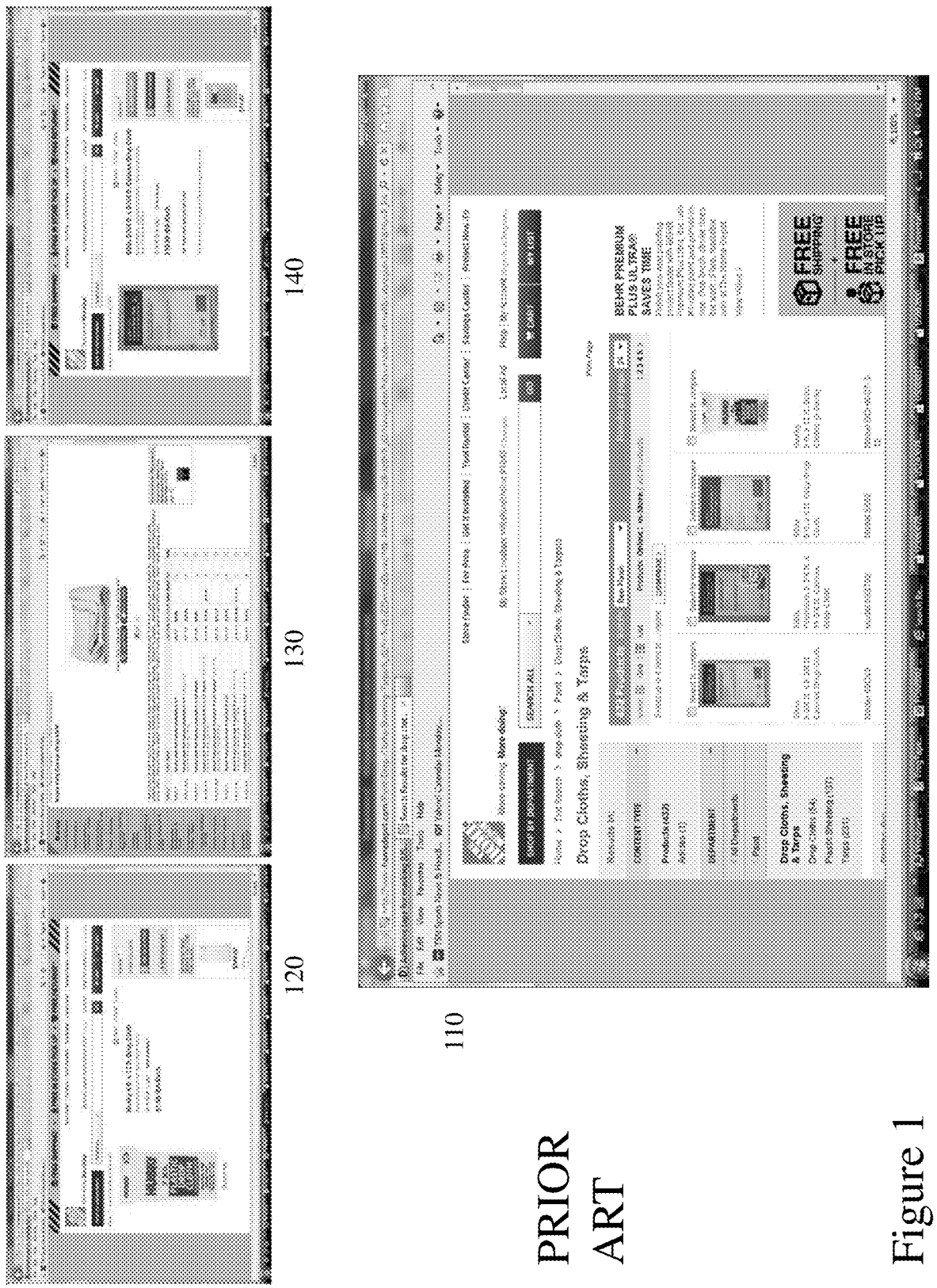
FIG. 1 depicts drop cloths and tarps according to the prior art available from a supplier.

The present invention is directed to the painting industry and more specifically to the provisioning of surface protection articles and more specifically to drop cloths, drop sheets, and protective coverings for use during the application of surface coatings such as paints, lacquers, etc.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

PAINT: Paint is any liquid, liquefiable, or mastic composition which after application to a substrate in a thin layer is converted to an opaque solid film. The common constituents of paint are pigments, binder, solvent, and additives.

Pigments are granular solids incorporated into the paint to contribute color, toughness, texture, give the paint some special properties or simply to reduce the cost of the paint. Alternatively, some paints contain dyes instead of or in combination with pigments. Pigments can be classified as either natural or synthetic types. Natural pigments include various clays, calcium carbonate, mica, silicas, and talcs. Synthetics would include engineered molecules, calcined clays, blanc fixe, precipitated calcium carbonate, and synthetic pyrogenic silicas. Hiding pigments, in making paint opaque, also protect the substrate from the harmful effects of ultraviolet light and include titanium dioxide, phthalo blue, red iron oxide, and many others. Fillers are a special type of pigment that serve to thicken the film, support its structure and simply increase the volume of the paint. Fillers are usually made of cheap and inert materials, such as diatomaceous earth, talc, lime, barytes, clay, etc. Floor paints that will be subjected to abrasion may even contain fine quartz sand as a filler. Not all paints include fillers whilst some paints contain very large proportions of pigment/filler and binder.

The binder, commonly referred to as the vehicle, is the actual film forming component of paint. It is the only component that must be present whereas other components listed below are included optionally, depending on the desired properties of the cured film. The binder imparts adhesion, binds the pigments together, and strongly influences such properties as gloss potential, exterior durability, flexibility, and toughness. Binders include synthetic or natural resins such as cement, alkyds, acrylics, vinyl-acrylics, vinyl acetate/ethylene (VAE), polyurethanes, polyesters, melamine resins, epoxy, or oils and are categorized according to drying, or curing mechanism. The four most common are simple solvent evaporation, oxidative crosslinking, catalyzed/cross linked polymerization, and coalescence.

Note that drying and curing are two different processes. Drying generally refers to evaporation of the solvent or thinner, whereas curing refers to polymerization of the binder. Depending on chemistry and composition, any particular paint may undergo either, or both processes. Paints that dry by simple solvent evaporation and contain a solid binder dissolved in a solvent are known as lacquers. A solid film forms when the solvent evaporates.

Latex paint, which is the dominant paint type within residential and general commercial applications, is a waterborne dispersion of sub-micrometre polymer particles. The term "latex" in the context of paint simply means an aqueous dispersion and are generally prepared by emulsion polymerization. Latex paints cure by a process called coalescence where first the water, and then the trace, or coalescing, solvent, evaporate and draw together and soften the latex binder particles and fuse them together into irreversibly bound networked structures, so that the paint will not re-dissolve in the solvent/water that originally carried it.

Paints that cure by oxidative crosslinking are generally single package coatings. When applied, the exposure to oxygen in the air starts a process that crosslinks and polymerizes the binder component. Classic alkyd enamels fall into this category. Oxidative cure coatings are catalyzed by metal complex driers such as cobalt naphthenate. Paints that cure by "catalyzed" polymerization are generally two package coatings that polymerize by way of a chemical reaction initiated by mixing resin and curing agent/hardener, and which cure by forming a hard-plastic structure. Depending on composition they may need to dry first, by evaporation of solvent. Classic two package epoxies or polyurethanes fall into this category.

The solvents main purposes are to adjust the curing properties and viscosity of the paint. It is volatile and does not become part of the paint film. It also controls flow and application properties and affects the stability of the paint while in liquid state. Its main function is as the carrier for the non-volatile components. These volatile substances impart their properties temporarily as once the solvent has evaporated or disintegrated, the remaining paint is fixed to the surface. Water is the main diluent for water-borne paints, even the co-solvent types.

Solvent-borne, also called oil-based, paints can have various combinations of solvents as the diluent, including aliphatics, aromatics, alcohols, ketones and white spirit. These include organic solvents such as petroleum distillate, esters, glycol ethers, and the like. Sometimes volatile low-molecular weight synthetic resins also serve as diluents. Such solvents are used when water resistance, grease resistance, or similar properties are desired. In some jurisdictions oil-based paints are being restricted or banned.

Figure 2:
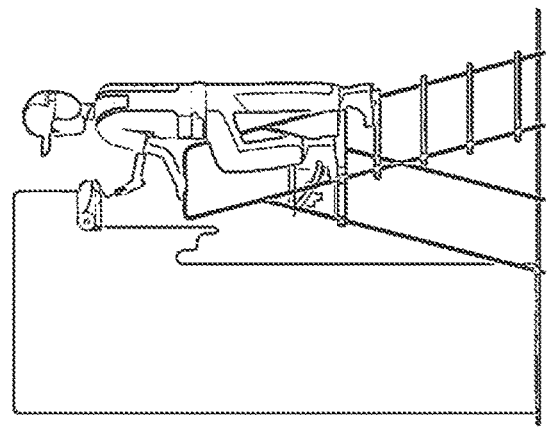
FIG. 2 depicts deployment examples of drop cloths and tarps.
Figure 2:
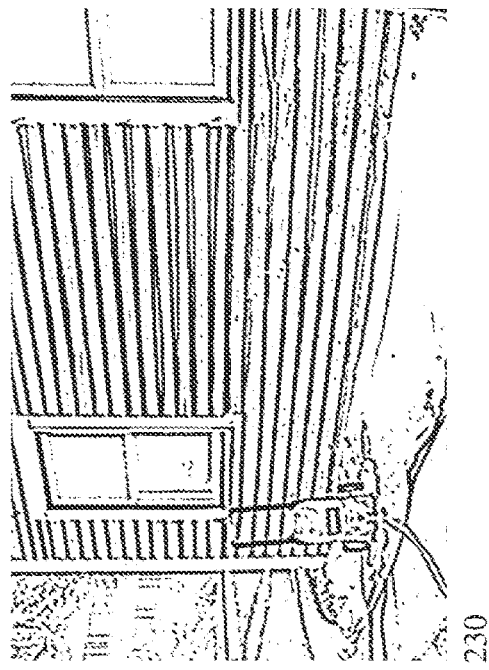
Figure 2:
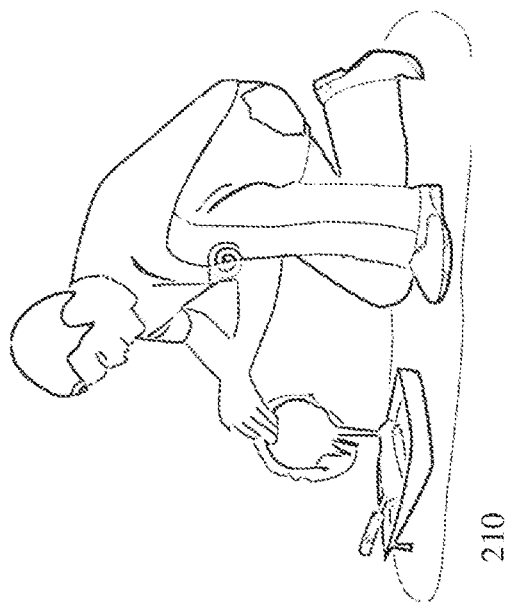
Figure 2:
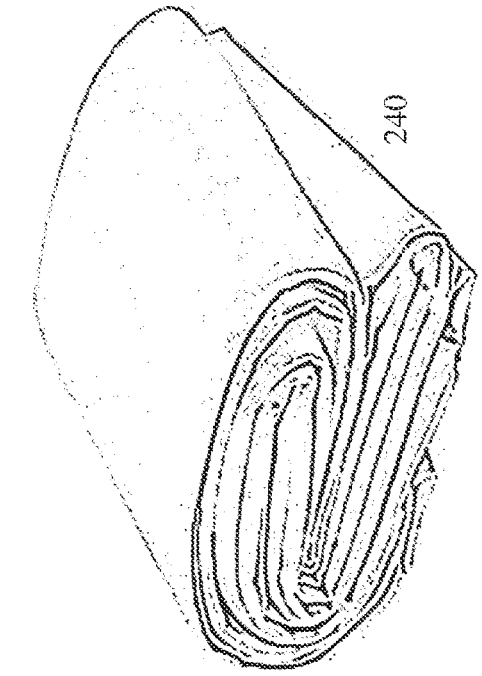

Besides the three main categories of ingredients, paint can have a wide variety of miscellaneous additives, which are usually added in very small amounts and yet give a very significant effect on the product. Some examples include additives to modify surface tension, improve flow properties, improve the finished appearance, increase wet edge, improve pigment stability, impart antifreeze properties, control foaming, control skinning, etc. Other types of additives include catalysts, thickeners, stabilizers, emulsifiers, texturizers, adhesion promoters, UV stabilizers, flatteners (deglossing agents), biocides to fight bacterial growth, and the like. Additives normally do not significantly alter the percentages of individual components in a formulation Modified Drop Cloths:

Referring to FIG. 1 there are depicted examples of prior art drop cloths and tarps as offered for sale through a major North American retailer, Home Depot Inc. First image 110 depicts an entry webpage for drop cloths, sheeting and tarps indicating that there are 432 products offered for sale both through their retail stores and online through the Internet. These being split into drop cloths (64), plastic sheeting (137) and tarps (231). Second image 120 depicts the product webpage for a plastic drop cloth manufactured under the Husky brand and offered as 9 feet by 12 feet sheet. Third image 130 depicts a product webpage for heavy duty canvas drop clothes indicating a range of sizes available. Fourth image 140 depicts a product webpage for a canvas drop cloth offered for sale under the Sibiu brand. Such drop cloths as depicted in FIG. 2 can be applied in first to third images 210 to 230 respectively wherein in the first image 210 the drop cloth is deployed upon the floor and the user is pouring paint from a paint can into a tray for use with a roller. In second image 220 the drop cloth is deployed on the floor wherein users are painting a wall with roller and brush. In third image 230 the drop cloth is deployed outside on the ground where the user is employing a powered jet sprayer to paint an exterior wall. Fourth image 240 depicts a drop cloth as known in the prior art before or after use where it is folded for ease of transportation.

Figure 3:
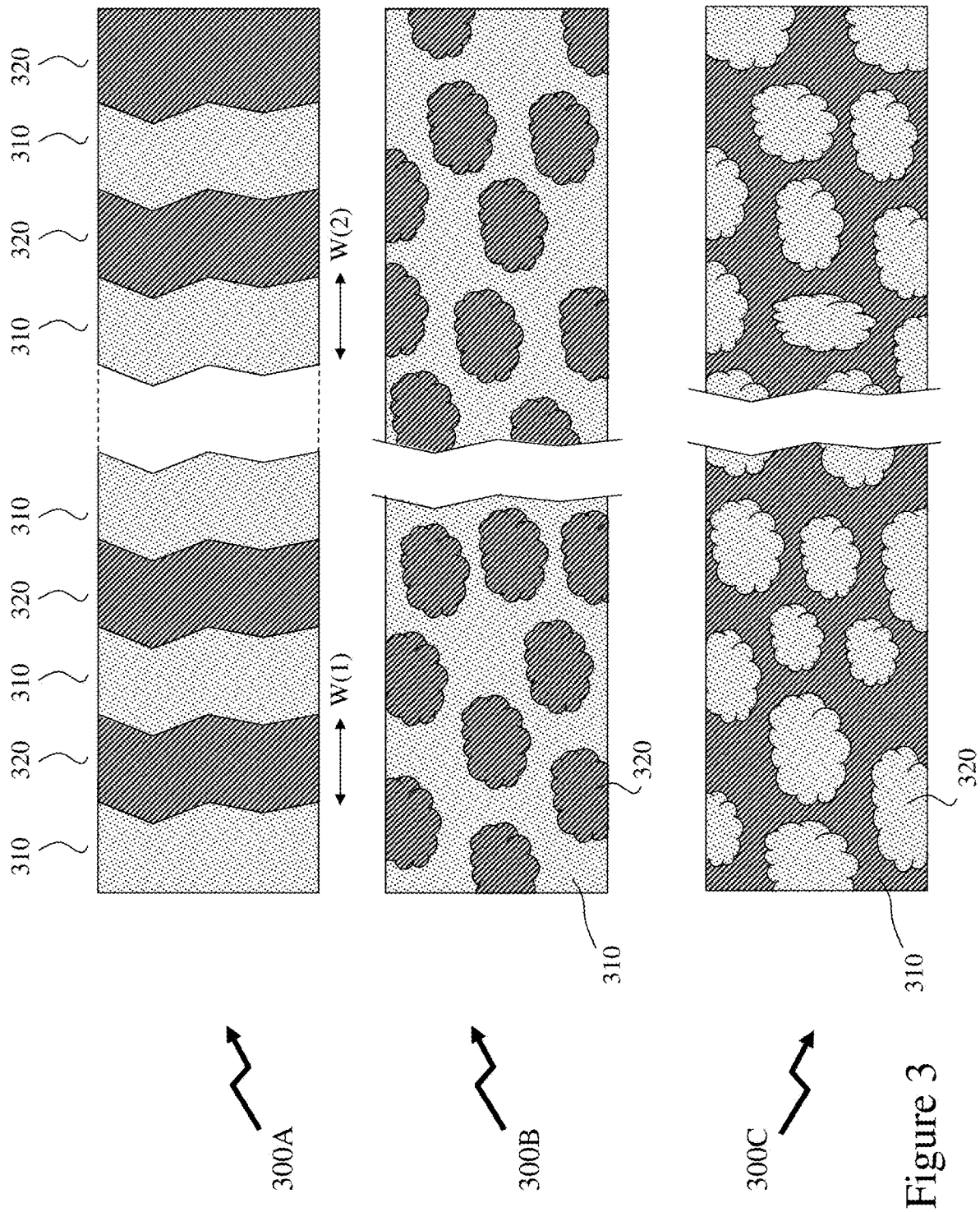
FIG. 3 depicts exemplary embodiments of blended polymer sheets according to embodiments of the invention.

Referring to FIG. 3 there are depicted first to third cross-sectional views 300A to 300C of drop cloths according to embodiments of the invention. First cross-sectional view 300A depicts a drop cloth comprising alternating first and second regions 310 and 320 formed from first and second polymers of widths W1 and W2 respectively. Accordingly, the first polymer within the first regions 310 may provide for either improved adhesion of the paint etc. to the surface of the cloth or improved adhesion of the drop cloth to a surface it is deployed upon. Accordingly, the second polymer within the second regions 310 may provide for the other of the improved adhesion of the paint etc. to the surface of the cloth and improved adhesion of the drop cloth to a surface it is deployed upon.

Such a drop sheet with a cross-section as depicted in first cross-sectional view 300A may be extruded using a plurality of nozzles which are alternately fed with the first and second polymers. The ratio of the first and second polymers being adjustable through either the width of nozzles for each and/or the number of nozzles assigned to each polymer. Optionally, rather than extruding the drop cloth from an extruder providing feed stocks of both polymers an initial formed co-polymer block of material may be subsequently extruded, rolled etc. to form the sheet from a circular, square, or other cross-section co-polymer block.

Within second and third cross-sectional views 300B and 300C drop cloth sheets according to embodiments of the invention are depicted formed from an immiscible co-polymer blend comprising first and second polymers 310 and 320 wherein within second cross-sectional view 300B the second polymer 320 is disposed within a matrix of the first polymer 310. Alternatively, as depicted within third cross-sectional view 300C the first polymer 310 is disposed within a matrix of the second polymer 320.

Figure 4:
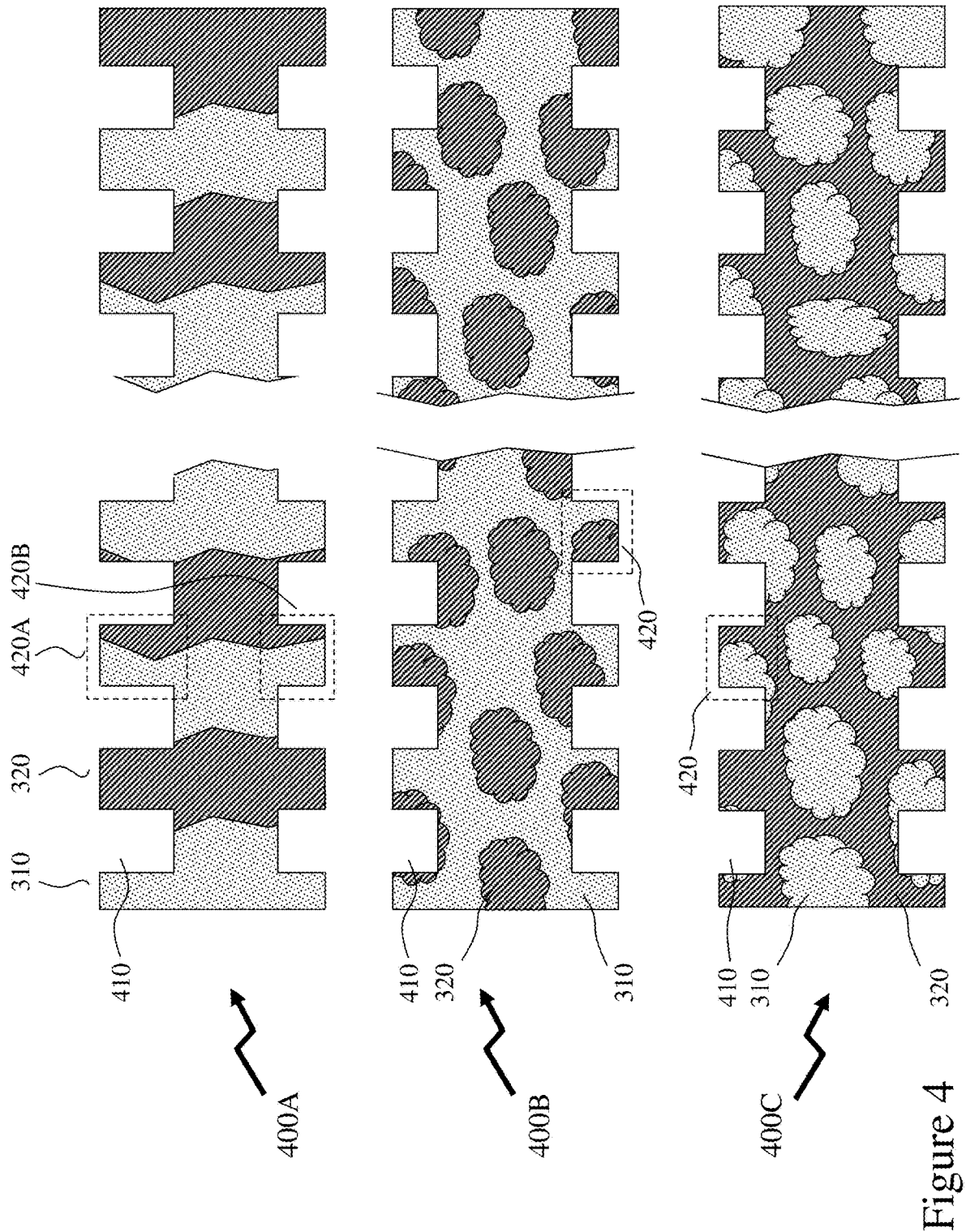
FIG. 4 depicts exemplary embodiments of blended polymer sheets according to embodiments of the invention.

Referring to FIG. 4 there depicted first to third cross-sectional views 400A to 400C of drop cloths according to embodiments of the invention wherein the drop cloth within each is depicted as described above in respect of first to third cross-sectional views 300A to 300C. Accordingly, first cross-sectional view 400A depicts a structured co-polymer sheet with alternative regions of first and second polymers 310 and 320 respectively. Upon the upper surface of the drop sheet are first embossed structures 420A whilst the lower surface of the drop sheet has second embossed structures 420B. As depicted second embossed structures 420B are shallower than first embossed structures 420A. Accordingly, different sides of the same drop sheet may offer different levels of property due to the variation of the drop cloth surface area in contact with the surface being protected and the surface area of the drop cloth presenting itself to the liquid(s) being employed that the item the drop cloth is covering and protecting.

However, within other embodiments of the invention both sides of the drop sheet may be embossed with the same embossed structures 420 as depicted in second and third cross-sectional views 400A and 400B respectively. Optionally, the geometry of the embossed structures may be different one side to another or between different drop sheet products. Such structures may be formed during the extrusion process or subsequently through roller embossing etc. and may be substantially parallel to the extrusion axis of the drop cloth, substantially perpendicular to the extrusion axis of the drop cloth or at a predetermined angle, e.g. 45°, to the extrusion axis of the drop cloth. Optionally, embossing through stamps or rollers may apply a periodic repeating pattern to the drop cloth such as series of concentric rings for example. Other periodic, aperiodic, regular, or irregular patterns may be formed with one or both surfaces of the drop cloth.

Figure 5:
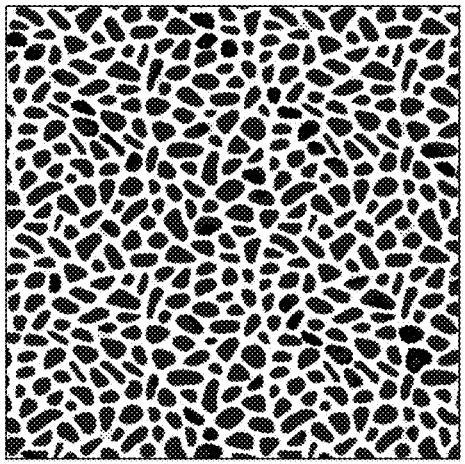
FIG. 5 depicts examples of blends according to embodiments of the invention.
Figure 5:
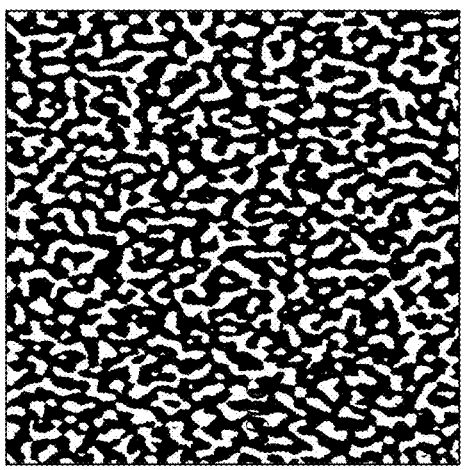
Figure 5:
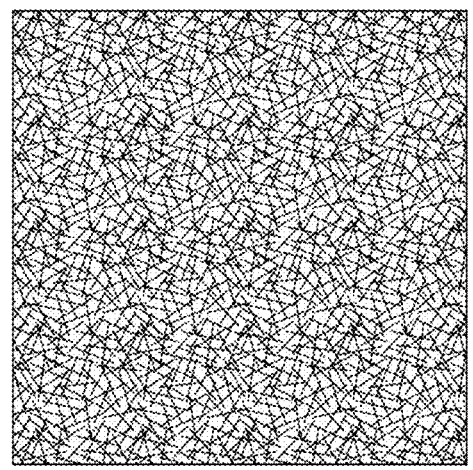
Figure 5:
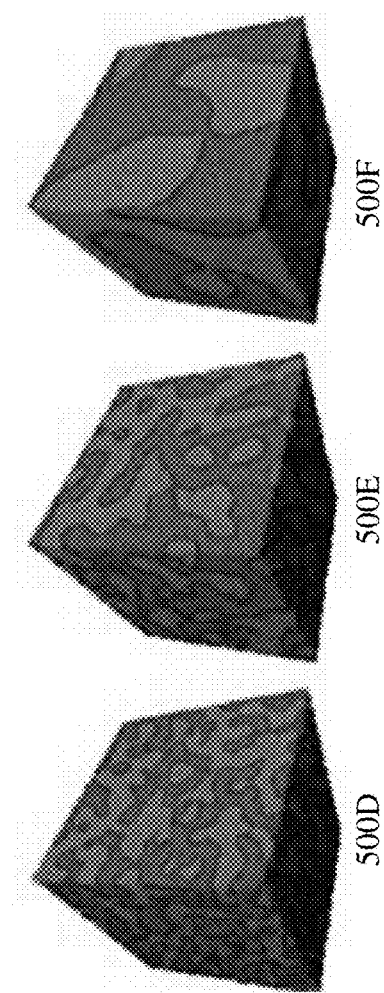

Referring to FIG. 5 there are depicted first to third images 500A to 500C respectively wherein a co-polymer region of a drop cloth according to an embodiment of the invention is depicted in each instance, wherein:

First image 500A depicts a co-polymer blend with irregular regions of both first and second polymers;

Second image 500B depicts a co-polymer blend with irregular regions of a first polymer within a matrix of a second polymer; and Third image 500C depicts a co-polymer blend with irregularly disposed "needle" like polymer regions of a first polymer within a matrix of a second polymer.

Also depicted in FIG. 5 are first to third perspective cross-sectional views 500D to 500D respectively of co-polymer blends depicting the variation in structure with immiscible polymers ranging from small regions of each polymer interspersed in first perspective cross-sectional view 500D to large regions of each polymer interspersed in third perspective cross-sectional view 500F.

Whilst embodiments of the invention described and depicted in respect of FIGS. 3 to 5 as comprising a pair of polymers it would be evident to one of skill in the art that the number of polymers may be 3, 4, 5, or more according to the desired characteristics of the drop cloth, cost, manufacturing technology etc.

Whilst embodiments of the invention described and depicted in respect of FIGS. 3 to 5 have been described as being formed by extrusion from feed stocks of the different polymers or from a block of co-polymer it would be evident that other methodologies with respect of the formation of the co-polymer blend may be employed without departing from the scope of the invention. Extrusion of two or more co-polymers within an extrusion system requires that both polymers soften substantially at elevated temperature allowing them to be extruded from multiple nozzles either discretely, such as in first cross-sectional views 300A and 400A in FIGS. 3 and 4 respectively, or after initial blending, such as in second and third cross-sectional views 300B, 300C, 400B and 400C respectively in FIGS. 3 and 4. However, it would be evident that alternatively a high temperature melting point polymer may be embedded within a matrix of a lower temperature melting point polymer by adding the high temperature melting point polymer as particulate matter into the lower temperature melting point polymer and then extruding the mixed polymer of liquid or molten polymer with embedded particles. Such particles could be dimensioned at a fraction of the final drop sheet thickness or alternatively be microparticles, nanoparticles, etc.

Figure 6:
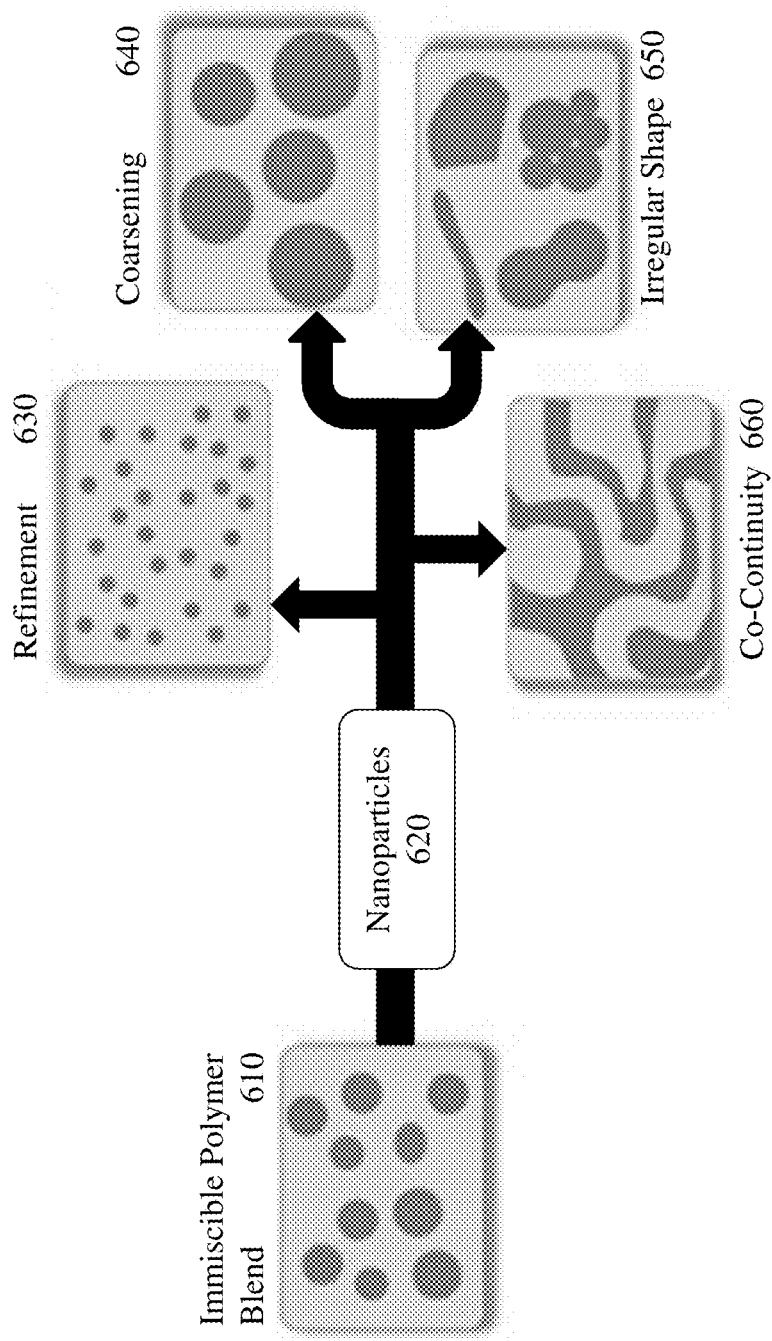
FIG. 6 depicts schematically the use of nanoparticles to adjust the final polymer blend structure within embodiments of the invention.

Alternatively, other nanoparticles may be added to an immiscible co-polymer blend in order to adjust the final disposition of the co-polymer within the drop sheet. This being depicted schematically in FIG. 6 wherein an immiscible co-polymer 610 has nanoparticles 620 added to it. Accordingly, in dependence upon the polymers within the co-polymer and the nanoparticles one of multiple compositional forms, depicted as first to fourth compositional forms 630 to 660 are established, these being:

First compositional form 630 wherein the polymer distribution is refined such that initially large regions of the immiscible first polymer embedded within the second polymer are replaced by smaller regions through a process known as refinement;

Second compositional form 640 wherein the polymer distribution is refined such that initial regions of the immiscible first polymer embedded within the second polymer are replaced by larger regions through a process known as coarsening;

Third compositional form 650 wherein the polymer distribution is adjusted such that initial regions of the immiscible first polymer embedded within the second polymer are replaced by a variety of irregular shaped regions; and Fourth compositional form 660 wherein the polymer distribution is refined such that initial regions of the immiscible first polymer embedded within the second polymer are replaced by continuous regions of the first polymer embedded within the second polymer.

Figure 7:
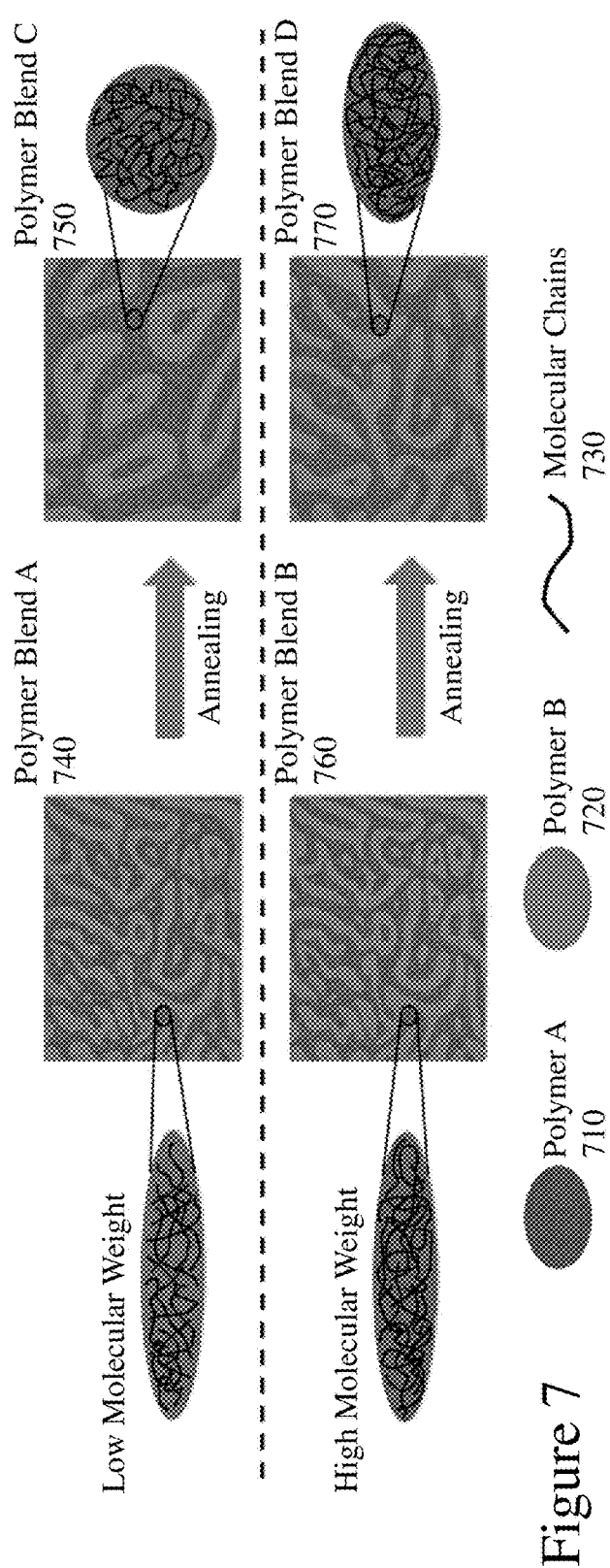
FIG. 7 depicts the impact of annealing on the final polymer blend structure within embodiments of the invention.

Nanoparticle induced phenomena within the polymer blend may include but not be limited to, morphology refinement, coarsening, formation of irregularly shaped domains, promotion of co-continuity, and morphology stabilization. Within some embodiments of the invention nanoparticles may provide a viable alternative to copolymer compatibilizers which are discussed below. Examples of nanoparticles may include, but not be limited to, carbon black, glass nanospheres, silicon dioxide nanoparticles, titanium dioxide nanoparticles, clay nanoparticles, carbon nanotubes, magnesium silicate ($Mg_4Si_6O_{15}(OH)_2.6H_2O$), graphene nanoplatelets, zinc oxide nanoparticles, Now referring to FIG. 7 there is depicted schematically the modification of a co-polymer blend material for forming drop sheets according to embodiments of the invention through a post-processing annealing stage. Accordingly, a first polymer 710 and second polymer 720 are to form the co-polymer blend wherein first polymer 710 is composed of extended molecular chains 730. As depicted in the upper portion of FIG. 7 a low molecular weight co-polymer blend A 740 is annealed yielding polymer blend C 750 wherein the molecular chains of the first polymer 710 have become entangled with respect to each other. In the lower portion of FIG. 7 a high molecular weight co-polymer blend B 760 is annealed yielding polymer blend D 770 wherein the molecular chains of the first polymer 710 which were initially entangled to some degree are now substantially more entangled with respect to each other. Accordingly, it may be beneficial or necessary within some embodiments of the invention to exploit an annealing stage with respect to the co-polymer drop sheet.

Figure 8:
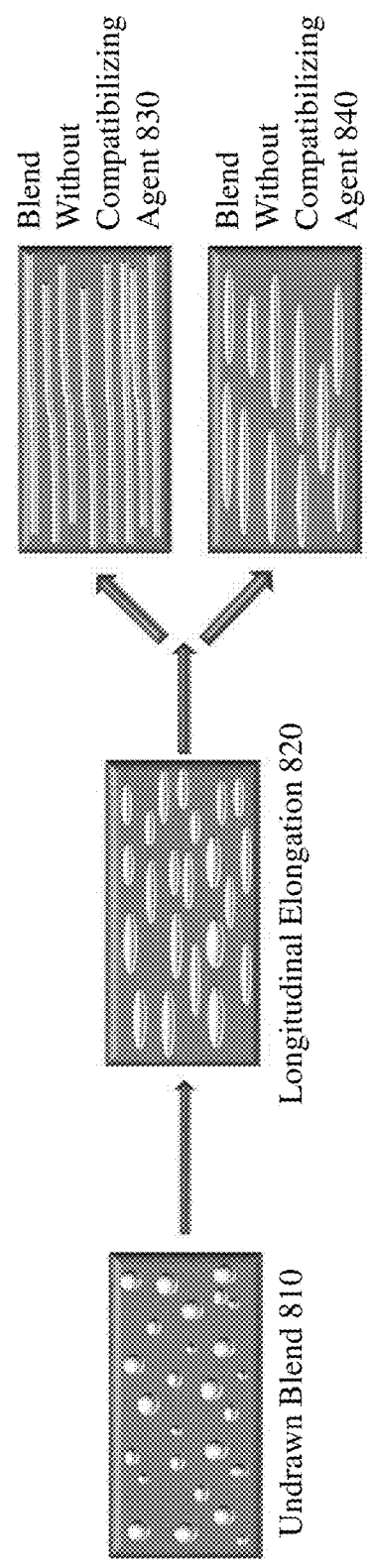
FIG. 8 depicts impact of longitudinal elongation with and without compatibilizing agents on the final polymer blend structure within embodiments of the invention.

Alternatively, or in combination with at least one of annealing and nanoparticles a compatibilizing agent may be added to the co-polymer blend in order to adjust the blended polymer structure. For example, in FIG. 8 an initial undrawn blend 810 of immiscible polymers is depicted with regions of a first polymer embedded within a second polymer. Accordingly, as a result of the fabrication process comprising extruding, rolling, embossing etc. the co-polymer blend undergoes longitudinal extension 820 resulting in the final sheets. As depicted in FIG. 8 the result of longitudinal extension within a blend without compatibilizing agent 830 results in extended elongation of the regions of the first polymer within the second polymer. In contrast longitudinal extension within a blend without compatibilizing agent 840 results in extended elongation of the regions of the first polymer within the second polymer but these either break to form multiple shorter smaller regions of the first polymer within the second polymer or their extension is limited as one or more of its properties are varied. For example, a compatibilizing agent that lowered the melting point of the first polymer would mean that is "solidifies" faster as the sheet is being extruded and cooled limiting extension of the first regions.

Compatibilizers may include block or graft copolymers as compatibilizers or reactive compatibilizers. A block or graft copolymers provides respective portions of the copolymer that are able to interact with the two phases of the blend to increase the stability of the phase morphology. In contrast reactive compatibilization is a procedure in which immiscible polymer blends are compatibilized by creating copolymers in the solution or melt state.

Within reactive compatibilization the copolymers are formed when the proper functional groups in each component of the immiscible blend interact in the compatibilization process. These interactions include hydrogen, ionic or covalent bonding. The functional groups that cause these interactions can be the end groups that are already present in the blend polymers (e.g., carboxylic acids or alcohols on polyesters, or amine groups on nylons). Another approach is to add functional groups to the component chains by grafting. The many possible functional groups allow for many types of commercial polymer blends, including polyamide/polyalkene blend systems.

Optionally, where a polymer added to the co-polymer blend is intended to accelerate or speed up drying of a liquid, e.g. paint, then it would be evident that multiple polymers may be added such that the drop sheet material acts upon the liquid coating, e.g. paint, in a different manner for each added polymer such that the drop cloth is compatible with the "drying" or "curing" requirements for different liquid types. As described above and below one of the regions may be superabsorbent, another catalytic, and another ionically charged to stabilize dispersed colloid components of the liquid coating.

Within the embodiments of the invention described within this specification and depicted in respect of FIGS. 3 to 8 the polymer blend is extruded. This may, according to the film thickness and mechanical properties of the polymer blend be blown film extrusion or sheet/film extrusion. Extrusion describes the process in which raw plastic is melted and formed into a continuous profile. This process starts by feeding plastic material (pellets, granules, flakes or powders) from a hopper into the barrel of the extruder. The material is gradually melted by the mechanical energy generated by turning screws and by heaters arranged along the barrel. The molten polymer is then forced into a die, which shapes the polymer into a shape that hardens during cooling. In the instance of two or more polymers these may be mixed at the extruder barrel by feeding from two or more hoppers or the mixture may be pre-blended and added to a single hopper.

Sheet/film extrusion is used to extrude plastic sheets or films that are too thick to be blown. There are two types of dies typically used: T-shaped and coat hanger. The purpose of these dies is to reorient and guide the flow of polymer melt from a single round output from the extruder to a thin, flat planar flow. In both die types ensure constant, uniform flow across the entire cross-sectional area of the die. Cooling is typically by pulling through a set of cooling rolls (calender or "chill" rolls). In sheet extrusion, these rolls not only deliver the necessary cooling but also determine sheet thickness and surface texture.

In contrast, blown film extrusion the process is the same as sheet/film extrusion process up until the die. There are three main types of dies used in this process: annular (or crosshead), spider, and spiral. Annular dies are the simplest and rely on the polymer melt channeling around the entire cross section of the die before exiting the die. A spider die consists of a central mandrel attached to the outer die ring via a number of "legs" and have a number of weld lines when produced which weaken the film. Spiral dies remove the issue of weld lines and asymmetrical flow but are complex. The melt is cooled somewhat before leaving the die to yield a weak semi-solid tube. This tube's diameter is rapidly expanded via air pressure, and the tube is drawn upwards with rollers, stretching the plastic in both the transverse and draw directions. The drawing and blowing cause the film to be thinner than the extruded tube, and also preferentially aligns the polymer molecular chains in the direction that sees the most plastic strain. If the film is drawn more than it is blown (the final tube diameter is close to the extruded diameter) the polymer molecules will be highly aligned with the draw direction, making a film that is strong in that direction, but weak in the transverse direction. A film that has significantly larger diameter than the extruded diameter will have more strength in the transverse direction, but less in the draw direction.

Drop Cloth Co-Polymer Blend Materials:

Within embodiments of the invention a co-polymer blend may exploit two or more polymers. Such a polymer blend may within embodiments of the invention be:

An Immiscible polymer blends (heterogeneous polymer blends) wherein if the blend is made of two polymers, for example, two glass transition temperatures will be observed.

Compatible polymer blends which are immiscible polymer blends that exhibit macroscopically uniform physical properties. The macroscopically uniform properties are usually caused by sufficiently strong interactions between the component polymers.

Miscible polymer blends (homogeneous polymer blend) wherein the polymer blend has a single-phase structure and a single glass transition temperature will be observed.

Examples of miscible polymer blends include, but are not limited to, polyphenylene oxide (PPO)—polystyrene (PS); polyethylene terephthalate (PET)—polybutylene terephthalate (PBT); poly(methyl methacrylate) (PMMA)—polyvinylidene fluoride (PVDF); polypropylene (PP)—ethylene propylene diene monomer rubber (EPDM); and polycarbonate (PC)—acrylonitrile butadiene styrene (ABS).

Polymers employed within polymer blends according to embodiments of the invention may be thermoplastic elastomers or the resulting polymer blend may be a thermoplastic elastomer. Thermoplastics may include, but not be limited to, poly(methyl methacrylate) (PMMA); acrylonitrile butadiene styrene (ABS); polylactic acid (polylactide, PLA); polybenzimidazole (PBI), polycarbonate (PC), polyether sulfone (PES), polyoxymethylene (POM); polyetherether ketone (PEEK); polyetherimide (PEI); and polyethylene (PE) including ultra-high-molecular-weight polyethylene (UHMWPE), high-density polyethylene (HDPE), medium-density polyethylene (MDPE), and low-density polyethylene (LDPE); polyphenylene oxide (PPO); polyphenylene sulfide (PPS); polypropylene (PP); polystyrene; polyvinyl chloride (PVC); and polytetrafluoroethylene (PTFE).

Within an embodiment of the invention the inventor has established a polymer blend comprising 50% polyethylene (PE) exploiting both high density polyethylene (HDPE) and low density polyethylese (LDPE) in combination with 50% elastomer. The elastomer within embodiments of the invention may be ethylene propylene diene monomer (EPDM); thermoplastic polyolefin (TPO); poly(styrene-butadiene-styrene) (SBS); and styrene-ethylene-butylene-styrene (SEBS). The mixture is melted at 220° C. before being extruded and formed in sheet form where the subsequent cooling is within either normal ambient conditions or within a controlled environment.

Within embodiments of the invention a super-absorbent polymer may form part of the polymer blend. Super-absorbent polymers are typically solid, granular cross-linked polyacrylate polymers that rapidly absorb and retain large volumes of aqueous and other types of solutions and liquids. While virtually any type of super-absorbent material may be used in conjunction with the present invention, sodium polyacrylate has proven to be particularly useful in that it has the ability to absorb as much as 200 to 300 times its mass in water. Sodium polyacrylate, $[-CH_2-CH(COONa)-]_n$, is a chemical that consists of very long carbon chains that are bonded together with sodium atoms found in the center of the molecule. This structure, through osmosis, is able to absorb and retain the water which can be many times its own weight.

The liquid is absorbed by a super-absorbent material are entirely encapsulated within the long chain molecule that makes up the super-absorbent material and these liquids are only slowly released therefrom. Accordingly, the latex based paint is reduced in volume and from its initial states as a dispersion of sub-micrometre polymer particles to polymer particles on the surface of the drop cloth. Other super-absorbent polymers that are available today and which may be used with the present invention include, but are not limited to, cellulosic or starch-graft copolymers and synthetic super-absorbent polymers made from polyacrylic acids, polymaleic anhydride-vinyl monomers, polyvinyl alcohols, and polyacrylonitrile.

Another class of super-absorbent polymers are swellable hydrogel-forming polymers, known as superabsorbent polymers (SAPs) or superabsorbents for short, are polymers of (co)polymerized hydrophilic monomers, graft (co)polymers of one or more hydrophilic monomers on a suitable grafting base, crosslinked cellulose ethers, crosslinked starch ethers, crosslinked carboxymethylcellulose, partially crosslinked polyalkylene oxide or natural product which are capable of swelling in aqueous fluids, such as paint.

Another group of SAPs are those that exploit dendritic structured hydrophilic polymers in the preparation of swellable hydrogel-forming polymers. These beneficially have an improved ability to bind to powdery and/or dusty additives and a high rate of swell. Dendritic polymers are synthetic macromolecules which are constructed by stepwise attachment of two or more monomers at a time to each previously attached monomer, so that the number of monomer end groups grows exponentially with every step to ultimately create a spherical tree-like structure. Hydrophilic polymers of dendritic structure which are useful for the purposes of the present invention are polyols having 8 or more, preferably 16 or more and more preferably 32 or more hydroxyl groups and a nonlinear skeleton which has preferably been branched 14-fold or more and more preferably 30-fold or more.

Hydrophilic polymers of dendritic structure include for example polyesters which are obtained from a polyol by esterification with a C3-C20-hydroxycarboxylic acid, preferably with a C4-C12-hydroxycarboxylic acid and more preferably with a C5-C8-hydroxy-carboxylic acid, the hydroxycarboxylic acid comprising at least two hydroxyl groups, preferably two hydroxyl groups, and/or at least two carboxylic acid groups. Particular preference is given to hydroxycarboxylic acids having two hydroxyl groups and one carboxylic acid group, especially 2,2-dimethylolpropionic acid. Polyols are compounds having at least two hydroxyl groups, examples being ethylene glycol, diethylene glycol, triethylene glycol, polyethylene glycol, propylene glycol, dipropylene glycol, tripropylene glycol, polypropylene glycol, butylene glycol, 1,3-propanediol, 1,4-butanediol, bisphenol A, glycerol, trimethylolpropane, pentaerythritol and/or sorbitol.

Useful hydrophilic polymers of dendritic structure for the purposes of the present invention further include polymers which are obtainable by condensation of polyols having at least three hydroxyl groups and subsequent alkoxylation. Examples thereof are branched polyethylene glycols obtainable by condensation of glycerol molecules and subsequent ethoxylation.

Useful hydrophilic polymers of dendritic structure for the purposes of the present invention further include all polymers which are obtainable by addition polymerization of a monomer having at least one hydroxyl group and subsequent alkoxylation. The addition polymerization is preferably carried out in the presence of a crosslinker. This gives polymer particles which have a hydrophilic surface because of a multiplicity of hydroxyl groups at the surface. For example, so-called star polyethylene glycols are obtainable by free-radical polymerization of p-hydroxyethylstyrene and subsequent alkoxylation. Further examples of useful polymers according to the present invention are the highly branched polymers of the HYBRANE® brand and also the Astramol Dendrimers®. They include in particular highly branched poly(propyleneimine)s, obtainable for example from butylenediamine by repeated multiple Michael addition with acrylonitrile and hydrogenation, star polycaprolactones, star nylon-6, highly branched polyesteramides, for example on the basis of the addition product from succinic anhydride and diethanolamine in a molar ratio of 1:1. The process of the present invention can also be carried out using so-called PAMAM dendrimers based on poly(amidoamine), obtainable for example from ammonia by repeated multiple reaction with methyl acrylate and ethylenediamine. It is possible to use polyglycerols, star-shaped polyethylene glycols and also other hydrophilic compounds, but preferably polyalcohols, of sphere- or cumulus-shaped, nonlinear molecular geometry.

The amount of hydrophilic polymer of dendritic structure utilized in the process of the present invention is in the range from 0.005% to 10% by weight, alternatively in the range from 0.01% to 5% by weight, alternatively in the range from 0.05% to 1% by weight and especially in the range from 0.10% to 0.80% by weight, based on the swellable hydrogel-forming polymer. The hydrophilic polymers of dendritic structure may be mixed with dried water-absorbing hydrogel. Dry refers to a water content of less than 20% by weight and more preferably of less than 10% by weight. But the hydrophilic polymer of dendritic structure can also be added to the swellable hydrogel-forming polymer before, during and/or after the surface-post-crosslinking operation, but it is preferably added during the surface-post-crosslinking operation.

The swellable hydrogel-forming polymers which can be used in the process of the present invention are in particular polymers of crosslinked (co)polymerized hydrophilic monomers, polyaspartic acid, graft (co)polymers of one or more hydrophilic monomers on a suitable grafting base, crosslinked cellulose ethers, crosslinked starch ethers or natural products which are swellable in aqueous fluids, such as guar derivatives for example. Preferably, the polymer to be crosslinked is a polymer which comprises structure units which derive from acrylic acid or esters thereof or which were obtained by graft copolymerization of acrylic acid or acrylic esters on a water-soluble polymeric matrix.

Examples of hydrophilic monomers suitable for preparing these swellable hydrogel-forming polymers are acids which are capable of addition polymerization, such as acrylic acid, methacrylic acid, vinylsulfonic acid, vinylphosphonic acid, maleic acid, maleic anhydride, fumaric acid, itaconic acid, 2-acrylamido-2-methylpropanesulfonic acid, 2-acrylamido-2-methylpropanephosphonic acid and also their amides, hydroxyalkyl esters and amino- or ammonio-containing esters and amides and also the alkali metal and/or ammonium salts of the acid-functional monomers. It is further possible to use water-soluble N-vinylamides such as N-vinylformamide or else diallyldimethylammonium chloride. Particularly preferred hydrophilic monomers are acrylic acid and methacrylic acid and also their alkali metal or ammonium salts, for example sodium acrylate, potassium acrylate or ammonium acrylate.

Suitable grafting bases for hydrophilic hydrogels which are obtainable by graft copolymerization of olefinically unsaturated acids or their alkali metal or ammonium salts can be of natural or synthetic origin. Examples are starch, cellulose or cellulose derivatives and also other polysaccharides and oligosaccharides, polyalkylene oxides, especially polyethylene oxides and polypropylene oxides, and also hydrophilic polyesters.

The swellable hydrogel-forming polymers have preferably been crosslinked, i.e., they comprise compounds having at least two double bonds which have been polymerized into the polymeric network. Suitable crosslinkers are in particular N,N'-methylenebisacrylamide and N,N'-methylenebismethacrylamide, esters of unsaturated mono- or polycarboxylic acids of polyols, such as diacrylate or triacrylate, for example butanediol or ethylene glycol diacrylate or methacrylate and also trimethylolpropane triacrylate and allyl compounds such as allyl (meth)acrylate, triallyl cyanurate, diallyl maleate, polyallyl esters, tetraallyloxyethane, triallylamine, tetraallylethylenediamine, allyl esters of phosphoric acid and also vinylphosphonic acid derivatives as described for example in EP-A-0 343 427. The process of the present invention can further utilize hydrogels which are prepared using polyallyl ethers as a crosslinker and by acidic homopolymerization of acrylic acid. Suitable crosslinkers are pentaerythritol triallyl and tetraallyl ethers, polyethylene glycol diallyl ether, ethylene glycol diallyl ether, glycerol diallyl ether, glycerol triallyl ether, polyallyl ethers based on sorbitol, and also ethoxylated variants thereof. The water-absorbing polymer is preferably a polymeric acrylic acid or a polyacrylate. This water-absorbing polymer can be prepared by a process known from the literature. Preference is given to polymers which comprise crosslinking comonomers in amounts from 0.001 to 10 mol % and preferably 0.01 to 1 mol %, but very particular preference is given to polymers which were obtained by free-radical polymerization and where a polyfunctional ethylenically unsaturated free-radical crosslinker was used which additionally bears at least one free hydroxyl group (such as for example pentaerythritol triallyl ether or trimethylolpropane diallyl ether).

The swellable hydrogel-forming polymers are preparable by addition polymerization processes known per se. Preference is given to addition polymerization in aqueous solution conducted as a gel polymerization. It involves for example 15% to 50% by weight aqueous solutions of one or more hydrophilic monomers and if appropriate of a suitable grafting base being addition polymerized in the presence of a free-radical initiator by utilizing the Trommsdorff-Norrish effect (Makromol. Chem. 1, 169 (1947)), preferably without mechanical mixing. The addition polymerization reaction may be carried out in the temperature range between 0 and 150° C. and preferably between 10 and 100° C., not only at atmospheric pressure but also at superatmospheric or reduced pressure. The addition polymerization can also be carried out in a protective gas atmosphere, for example nitrogen. The addition polymerization may be induced using high-energy electromagnetic rays or the customary chemical addition polymerization initiators, for example organic peroxides, such as benzoyl peroxide, tert-butyl hydroperoxide, methyl ethyl ketone peroxide, cumene hydroperoxide, azo compounds such as azodiisobutyronitrile and also inorganic peroxo compounds such as $(NH_4)_2S_2O_8$ or $K_2S_2O_8$ or $H_2O_2$. They may be used if appropriate in combination with reducing agents such as sodium hydrogensulfite and iron(II) sulfate or redox systems, where the reducing component included is an aliphatic and aromatic sulfinic acid, such as benzenesulfinic acid and toluenesulfinic acid or derivatives of these acids, such as Mannich adducts of sulfinic acids, aldehydes and amino compounds, as described in DE-A-13 01 566. The performance characteristics of the polymers can be further improved by postheating the polymer gels in the temperature range from 50 to 130° C. and preferably from 70 to 100° C. for several hours.

The gels obtained are neutralized for example to 0 to 100 mol %, preferably 25 to 90 mol %, especially between 50 and 85 mol %, based on monomer used, for which the customary neutralizing agents can be used, preferably alkali metal hydroxides or alkali metal oxides, but more preferably sodium hydroxide, sodium carbonate and sodium bicarbonate.

Neutralization is typically achieved by mixing the neutralizing agent as an aqueous solution or else preferably as a solid into the gel. For this, the gel is mechanically comminuted, and the neutralizing agent is sprayed on, scattered on or poured on and then carefully mixed in. The gel mass obtained can then be repeatedly passed through the meat grinder for homogenization. The neutralized gel mass is then dried with a belt or can dryer until the residual moisture content is preferably below 10% by weight and especially below 5% by weight. The dried hydrogel is subsequently ground and sieved, and the grinding can typically be carried out using roll mills, pin mills or swing mills. The particle size of the sieved hydrogel is preferably in the range from 45 to 1000 µm, more preferably in the range from 45 to 850 µm, even more preferably in the range from 100 to 800 µm and yet more preferably in the range from 100 to 700 µm.

When more than 80% by weight of the particles are from 45 to 850 µm or from 100 to 850 µm or from 100 to 800 µm or from 150 to 800 µm or from 200 to 850 µm or from 250 to 850 µm or from 300 to 850 µm in size, the fraction of particles greater than 850 µm is preferably not more than 1% by weight and more preferably not more than 0.5% by weight.

Further preferred particle sizes are in the range of from 100-500 µm, 150-500 µm, 100-600 µm, 300-600 µm, smaller than 600 µm, smaller than 400 µm, more preferably smaller than 300 µm. Not less than 80% and preferably not less than 90% of all particles come within these ranges. The fraction of particles smaller than 100 µm is preferably less than 3% by weight and more preferably less than 1% by weight.

When from 80% to 95% by weight of the particles are from 150 to 500 µm or from 100 to 500 µm in size, it is preferable for the fraction of particles greater than 500 µm to be only not more than 10% by weight and the fraction of greater than 600 µm to be less than 1% by weight. When from 80% to 95% by weight of the particles are from 150 to 600 µm or from 100 to 600 in size, it is preferable for the fraction of particles greater than 600 µm to be only not more than 10% by weight and preferably not more than 5% by weight and most preferably less than 1% by weight.

The post-crosslinking of swellable hydrogel-forming polymers is typically carried out by spraying a solution of the surface post crosslinker onto the dry base polymer powder. After spraying, the polymeric powder is thermally dried, and the crosslinking reaction can take place not only before but also during the drying. The spraying with a solution of the crosslinker is preferably carried out in reaction mixers or mixing and drying ranges. Fluidized bed dryers can be used as well. Drying may take place in the mixer itself, by heating the jacket or introducing a stream of warm air. It is similarly possible to use a downstream dryer, such as for example a tray dryer, a rotary tube oven or a heatable screw. But it is also possible for example to utilize an azeotropic distillation as a drying process. Preferred drying temperatures are in the range from 50 to 250° C., preferably in the range from 60 to 200° C. and more preferably in the range from 70 to 180° C. The preferred residence time at this temperature in the reaction mixer or dryer is below 60 minutes, preferably below 30 minutes and more preferably below 10 minutes.

The surface post crosslinkers can be used alone or combined with other surface post crosslinkers, for example ethylene glycol diglycidyl ether, diethylene glycol diglycidyl ether, polyethylene glycol diglycidyl ether, propylene glycol diglycidyl ether, dipropylene glycol diglycidyl ether, polypropylene glycol diglycidyl ether, glycerol diglycidyl ether, polyglycerol diglycidyl ether, epichlorohydrin, ethylenediamine, ethylene glycol, diethylene glycol, triethylene glycol, polyethylene glycol, propylene glycol, dipropylene glycol, tripropylene glycol, polypropylene glycol, butylene glycol, 1,3-propanediol, 1,4-butanediol, bisphenol A, glycerol, trimethylolpropane, pentaerythritol, sorbitol, diethanolamine, triethanolamine, ethylenediamine, ethylene carbonate, propylene carbonate, 2-oxazolidones, such as 2-oxazolidinone or N-hydroxyethyl-2-oxazolidinone, 2,3-morpholinediones, such as N-2-hydroxyethyl-2,3-morpholinedione, N-methyl-2,3-morpholinedione, N-ethyl-2,3-morpholinedione and/or N-tert-butyl-2,3-morpholinedione, 2-oxotetrahydro-1,3-oxazine, N-acyl-2-oxazolidones, such as N-acetyl-2-oxazolidone, bicyclic amide acetals, such as 5-methyl-1-aza-4,6-dioxabicyclo[3.3.0]octane, 1-aza-4,6-dioxabicyclo[3.3.0]octane and/or 5-isopropyl-1-aza-4,6-dioxabicyclo[3.3.0]octane, and/or bis- and poly-2-oxazolidinones.

The surface postcrosslinker is preferably dissolved in solvents which are not self-reactive, preferably in lower alcohols, such as for example methanol, ethanol, isopropanol, propylene glycol, ethylene glycol, preferably isopropanol, most preferably in aqueous solutions of such suitable alcohols, in which case the alcohol content of the solution is in the range from 10% to 90% by weight, more preferably between 25% to 70% by weight and especially between 30% to 50% by weight.

The surface post crosslinker is used in an amount from 0.01% to 1% by weight, based on the polymer used, and the crosslinker solution itself is used in an amount from 1% to 20% by weight and preferably from 3% to 15% by weight, based on the polymer used.

The swellable hydrogel-forming polymers of the present invention are useful for absorbing blood and/or body fluids in hygiene articles, such as for example incontinence articles, napkins, tampons, liners. To this end, the swellable hydrogel-forming polymers of the present invention can be processed with fibers, such as cellulose for example, and also fibrous webs to form absorbing composites.

The dendritic polymers used in the process of the present invention are hydrophilic by virtue of their nonlinear structure, but their specific geometry substantially curtails any unwanted tendency for thermal post-crosslinking, so that the dendritic polymers can be added during the surface-post-crosslinking operation. There is no need for any additional admixing step. The globular shape is particularly advantageous here with regard to the viscosity of the aqueous solution in incipiently or fully swollen superabsorbents. Consequently, saline flow conductivity remains high, even at a high polymer use level.

The conveying properties of the end product are also influenced by the solvent used at surface post-crosslinking. Propylene glycol/water has distinct advantages over isopropanol/water. On the other hand, unconverted propylene glycol (unlike unconverted isopropanol) is difficult to remove and remains in the end product. The alcohol content of the dried end product is typically in the range from 5000 to 15 000 weight ppm when propylene glycol is used, but is less than 1000 weight ppm, preferably less than 500 weight ppm and more preferably less than 100 weight ppm when isopropanol is used, which is preferred.

In accordance with another embodiment of the invention the surface layer of a drop cloth includes a compound, ingredient, material or agent that upon dissolution into the liquid coating the surface of the drop cloth causes the migration of the liquid coating to be impeded. This paint drying compound serves to inhibit the flow of the liquid coating the surface layer of the drop cloth. The paint drying compound may impede the migration of the liquid coating by, for example, inducing aggregation of particles within the liquid coating the surface layer, or by increasing the viscosity of the liquid coating the surface layer, both of which mechanisms tend to form a barrier that impedes, or otherwise inhibits, the migration of the liquid.

More specifically, in one aspect, the surface layer may include a compound, ingredient, material or agent capable of causing a first component of a mixture to combine with other such components, thereby forming larger associations. The term "mixture" as used herein generally refers to mixtures with uniformly dispersed components, stable mixtures, suspensions, emulsions, dispersions, and/or solutions. In a specific example, the mixture may be a stable mixture with uniformly dispersed components, such as latex paint. In the case of a latex paint, the first component that combines to form larger associations may be polymer dispersion particles.

In another aspect, the paint curing treatment may be capable of causing the first component of the mixture to be drawn together and thereby separate from the mixture (i.e. the paint curing treatment causes the mixture to stratify or become less uniform). The separation or stratification of the mixture is typically observable to the naked eye. The first component of the mixture may be, for example, solid, semisolid, or liquid particles dispersed in a suspension (i.e. the suspension may be a dispersion or an emulsion), such as an aqueous suspension.

The mixture may be an anionically charged soluble polymer paint mixture including dispersed inorganic pigment particles. In this case, the first component of the paint mixture may be, for example, a polymer that carries an anionic charge.

In a more specific aspect, the paint drying compound may be a material that upon contact with and dissolution into a suspension is capable of causing solid, semisolid, or liquid particles dispersed in a suspension to combine to form larger particle associations, or groups of particles. In an even more specific aspect, the paint drying compound causes the larger particle associations to combine irreversibly. That is, the combined particles will not return to their uncombined (i.e. separated or dispersed) condition naturally over time, but rather require that some external stimulus be applied to the system to cause the larger particle associations to return to their dispersed, separated, or dissociated, condition. Thus, in certain embodiments, the combined particles cannot be re-dispersed homogenously even with significant input of dispersive energy. The process by which the paint drying compound causes particles to combine may be described generally as one or more of the following: aggregation, coalescence, agglomeration, flocculation, coagulation, dehumidification, and/or precipitation.

The ability of the surface layer to inhibit the migration of the liquid coating, i.e. paint, will depend, in part, on the nature of the particular coating. The coating may be, for example, an aqueous suspension, in which case the surface layer will be present in an amount sufficient to induce aggregation or increase the viscosity of the aqueous suspension when the suspension comes into contact with the surface layer. The coating may include charge-stabilized colloidal particles. In this case, the surface layer will have a charge opposite from the charge of the colloidal particles, thereby stabilizing the particles when the coating comes into contact with the surface layer. The coating may include one or more chemical compounds to adjust a property of the surface layer, such as for example its viscosity or its acidity/basicity.

More specifically, the liquid coating may comprise a colloidal dispersion in which the colloidal dispersion is anionically stabilized, such as is the case with latex paint. In this case, in order for the surface layer to be effective, it will have a net positive charge. More particularly, if the colloidal dispersion is anionically stabilized, the surface layer will generally include, on average, at least two amine groups per molecule, and/or a metal cation having a valence of at least 2. The amine groups may be primary, secondary, tertiary or quaternary amines. Primary, secondary, and tertiary amines may be protonated, so they carry a positive charge. Regardless of the particular coating, it is desirable that the surface layer be present in an amount sufficient to inhibit the migration of the liquid coating.

In the illustrated embodiment, the surface layer may be provided as a layer on the entire surface of the drop cloth or it may be provided across a predetermined portion of the drop cloth. According to another embodiment of the invention the surface layer is provided upon a textured surface of the drop cloth to increase the effective surface area of the drop cloth. According to another embodiment of the invention the surface layer may be disposed across the exposed surfaces of a porous material. Without limiting the invention, the surface layer upon contact and dissolution into a paint dispersion may serve to disrupt the stability of the paint dispersion, thereby causing the particles in the paint that are in the vicinity of the surface layer across the drop cloth to combine, e.g. aggregate or agglomerate.

In one embodiment, the surface layer is water soluble and may include a paint drying compound, such as a polymer or metal ion, having a solubility in water of at least about 0.1 grams/100 grams deionized water at 23° C., at least about 0.2 gram/100 grams of deionized water at 23° C., at least about 0.5 gram/100 grams of deionized water at 23° C., at least about 1 gram/100 grams of deionized water at 23° C., at least about 2 grams/100 grams of deionized water at 23° C., at least about 5 grams/100 grams of deionized water at 23° C., at least about 10 grams/100 grams of deionized water at 23° C., and at least about 20 grams/100 grams of deionized water at 23° C., at a pH of 6, as measured according to the test method set forth below. It has been found that paint curing treatments including paint drying compounds having a solubility in water of at least about 10% by weight, 15% by weight, and 20% by weight are desirable. In other embodiments, the paint curing treatment compound may be alcohol soluble, soluble in glycols, or soluble in other humectants that may be present in the surface coating composition.

It is desirable that the surface layer be in the cationic form ready to be used in the drop cloth. Thus, it is desirable that primary, secondary, and tertiary amines be at least partially protonated with an acid to adjust it to the proper pH. Desirable pH would typically be at least about 4, at least about 5, at least about 6, and at least about 6.5, and no greater than about 9, no greater than about 8, and no greater than about 7.5. Ideally, the pH is adjusted to ensure that at least 10% of the polycationic polymer amines are protonated. This will be dependent on the basicity of the amines present and can be easily determined by titration.

In one specific embodiment, the drop cloth includes a polycationic material incorporated into the drop cloth to contact the liquid coating when the liquid coating contacts the surface layer. In another embodiment, the drop cloth includes a material having an amine equivalent weight of at least about 40 g/equivalent, and no greater than about 1000 g/equivalent, incorporated into the drop cloth to contact the liquid coating when the liquid coating contacts the surface layer of the drop cloth. Suitable polycationic materials have an amine equivalent weight of no greater than about 1000 g/equivalent, no greater than about 500 g/equivalent, and no greater than about 350 g/equivalent.

For the purposes of this disclosure, the amine equivalent weight is taken as the average amine equivalent weight of the polymer normally determined by titration. For quaternary amines, this is the equivalent weight of the ionic form. For primary, secondary, and tertiary amines, this is the equivalent weight of the free amine form as would be determined, for example, by titration. By way of example, polyethylene imine would have an amine equivalent weight of approximately 43 g polymer/equivalent of amine, and polydiallyldimethylammonium chloride would have an amine equivalent weight of 160.5 g polymer/equivalent of amine.

The particular manner in which the surface layer is incorporated into the drop cloth is not critical, so long as the surface layer is provided along at least a substantial portion of the surface layer and is present in an amount sufficient to produce the desired function described herein. For example, the surface layer may be incorporated into, or applied onto, the substrate, or incorporated into, or applied onto, the substrate. For example, the substrate may be saturated with the surface layer, or the surface layer may be provided as a layer across the width of a first major surface of the substrate such that the surface layer is present across the substrate, or the surface layer may be provided as a discrete layer along substantially only the surface layer of the drop cloth, as illustrated.

The paint curing treatment may comprise cationic materials and/or polycationic materials. Suitable cationic materials include polycationic small molecules, polycationic polymers or oligomers having at least 2, at least 4, and at least 6 cationic groups per molecule on average. The polycationic polymers or oligomers may be organic cationic polymers, as well as polysiloxane and organopolysiloxane containing polycationic polymers. The cationic polymers may be linear, branched, or crosslinked. Particularly suitable polycationic polymers include Polyquaternium-6 and Polyquaternium-37 series polymers. A suitable polycationic polymer is a Polyquaternium 6 series polymer available from Nalco Company, Naperville, Ill. under the trade designation Merquat. Merquat Polyquaternium-6 series polymers are highly charged water soluble cationic homopolymers of diallyl dimethyl ammonium chloride.

Polycationic polymers and oligomers may be based on synthetic or natural based polymers, such as polysaccharides and polymers derived from vinyl monomers. For example, cationic modified celluloses, guar gum, starch, proteins, and the like may be suitable. Certain polycationic materials may be surface active and capable of reducing the surface tension of aqueous compositions significantly, e.g. to less than 45 dyne/cm at a concentration of 0.5% by weight or less.

More specifically, suitable cationic polymers may comprise a polyquaternary amine polymer, a polyfunctional protonated primary, secondary, tertiary amine, and combinations thereof. Other suitable cationic polymers comprise at least one of poly(diallyldimethylammonium salt), protonated or quaternized homo- or copolymer of an amine functional acrylic monomer, and protonated polyethylene imine. Suitable amine functional acrylic monomers include acrylates, methacrylates, acrylamides and methacrylamides. More specific vinyl monomers include, for example, diallyldimethylammonium salt, methacryloyloxyalkyl trialkyl ammonium salt, acryloyloxyalkyl trialkyl ammonium salt, quaternized dialkylaminoalkylacrylamidine salt, trialkylaminoalkyl acrylate and methacrylate salts, dialkyldiallyl ammonium salts (e.g. dimethyldiallylammonium salts), acrylamidoalkyltrialkyl salts, methacrylamidoalkyltrialkyl salts, and alkyl imidazolinium salts.

In another embodiment, the paint curing treatment may comprise a cationic saline. For example, protonated primary, secondary, tertiary silanes, as well as quaternary silanes, may be applied to the edge of the masking article alone or in combination with non-ionic silanes to provide an effective paint curing treatment. Examples of suitable aminoalkyl alkoxysilanes and aminoalkyl acyloxysilanes, which contain secondary amino groups, include N-phenylaminopropyl-trimethoxysilane, bis-(γ-trimethoxysilylpropyl)amine, N-cyclohexylaminopropyl-triethoxysilane, N-methylaminopropyl-trimethoxysilane, N-butylaminopropyl-trimethoxysilane, N-butylaminopropyl-triacyloxysilane, 3-(N-ethyl)amino-2-methylpropyl-trimethoxysilane, 4-(N-ethyl)amino-3,3-dimethylbutyl-trimethoxysilane and the corresponding alkyl diethoxy, alkyl dimethoxy and alkyl diacyloxysilanes, such as 3-(N-ethyl)amino-2-methylpropyl-methyldimethoxysilane.

Examples of suitable aminoalkyl alkoxysilanes and aminoalkyl acyloxysilanes containing primary amino groups include 3-aminopropyl-triacyloxysilane, 3-aminopropyl-methyldimethoxysilane; 6-aminohexyl-tributoxysilane; 3-aminopropyl-trimethoxysilane; 3-aminopropyl-triethoxysilane; 3-aminopropyl-methyl diethoxysilane; 5-aminopentyl-trimethoxysilane; 5-aminopentyl-triethoxysilane; 4-amino-3,3-dimethyl-butyl-trimethoxysilane; and 3-aminopropyl-triisopropoxysilane. 3-amino-propyl-trimethoxysilane and 3-aminopropyl-triethoxysilane are particularly preferred. Examples of suitable quaternary ammonium silanes include trimethylaminopropyltrimethoxysilane salts, trimethoxysilyl)-propyldimethyloctadecylammonium chloride, and the like.

Such silanes will hydrolyze and condense to form cationic polysiloxane oligomers, polymers and crosslinked networks. They may be applied as silanes, hydrolysis products, oligomers, or polymers. Such silanes may be used in combination with cationic polymers and/or multivalent metals.

Counter ions of the cationic paint curing treatments may be any that are suitable including, for example, halides, carboxylates, and the like. Particularly suitable are those salts that promote solubility and, in particular, rapid hydration upon contact with the paint. Thus, suitable counter ions may comprise hydroxyl or other polar groups in addition to the anionic portion to promote hydration.

In another embodiment, the surface layer may comprise an inorganic compound. Suitable inorganic compounds include, for example, polycationic (i.e. polyvalent) metal compounds. Suitable polyvalent metal compounds may comprise a metal salt or compound that will dissolve in a solvent comprising water to generate a cation carrying a cationic charge of at least two. The metal salt may comprise a soluble salt of aluminum, iron, zirconium, chromium, cobalt, titanium, magnesium, zinc, calcium, copper, manganese, strontium, yttrium, lanthanum, polyaluminum halide, basic aluminum nitrate, hydrolyzed aluminum, aluminum sulfate, zirconyl salts, titanyl salts, and combinations thereof. Suitable metal salts typically have a solubility in water of at least about 0.1 grams/100 grams of deionized water at 23° C., at least about 1 gram/100 grams of deionized water at 23° C., and at least about 5 grams/100 grams of deionized water at 23° C.

The surface layer may also include combinations of organic materials, such as a cationic oligomer or polycationic polymer, and inorganic materials, such as a polyvalent metal cation.

The paint drying compound may comprise from at least about 1% by dry weight, at least about 5%, at least about 10%, or at least about 15%, to no greater than about 95% by dry weight, no greater than about 85% by weight, no greater about 75%, or no greater than about 65% of the dried paint curing treatment formulation.

The surface layer may optionally include a humectant. Suitable humectants may comprise polyhydroxy and/or ionic group containing compounds, or organic or inorganic salts separate and distinct from any salt that may be present as part of the polycationic compound(s) in the surface layer. Suitable polyhydroxy compounds include, for example glycerol, propylene glycol, dipropylene glycol, polypropylene glycol, ethylene glycol, diethylene glycol, triethylene glycol, polyethylene glycol, sorbitol, pantothenol, xylitol, mannitol, erythritol, sucrose, glucose, gluconic acid salts, pyrrolidine carboxylic acid, acetamide MEA, lactamide MEA, organic salts, inorganic salts, and combinations thereof. Particularly suitable organic salts typically have a molecular weight of less than about 2000. Examples of suitable organic salts include Hydroxypropyl Bis-Hydroxyethyldimonium Chloride, AQ-acetamidopropyl trimmonium chloride, and LQ-lactamidopropyl trimmonium chloride. Humectants may be present in the dried paint curing treatment composition from at least about 0% by dry weight, at least about 5%, or at least about 15%, to no greater than about 95% by dry weight, no greater than about 85% by weight, or no greater than about 75%.

The surface layer may also optionally include a surfactant. As used herein, the term "surfactant" refers to an amphiphile (i.e. a molecule possessing both polar and nonpolar regions which are covalently bound) capable of reducing the surface tension of water and/or the interfacial tension between water and an immiscible liquid. Suitable surfactants may be cationic, nonionic, or amphoteric. Combinations of surfactants may also be used, if desired.

Suitable surfactants may be selected from the group consisting of poloxamer (polyethylene oxide/polypropylene oxide block copolymers), cationic surfactants, zwitterionic surfactants, and mixtures thereof. Cationic, amphoteric, and non-ionic surfactants and, in particular, ethylene oxide/propylene oxide surfactants, such as poloxamers, are particularly suitable.

One or more surfactants may be included in the various paint curing treatment compositions described herein at a suitable level to produce the desired result. In one embodiment, the surfactants are present in a total amount of at least about 0.01 wt-%, at least about 0.05 wt-%, or at least about 0.075 wt-%, based on the total weight of the ready to use paint curing treatment coating composition. In the dried composition the surfactant will represent about 0-30% by weight, or about 1-25% by weight of the dried coating of the paint curing treatment.

Exemplary cationic surfactants include, but are not limited to, salts of optionally polyoxyalkylenated primary, secondary, or tertiary fatty amines; quaternary ammonium salts such as tetraalkylammonium, alkylamidoalkyltrialkylammonium, trialkylbenzylammonium, trialkylhydroxyalkylammonium, or alkylpyridinium having compatible anionic counter ions such as halides (preferably chlorides or bromides) or alkyl sulfates, such as methosulfate or ethosulfate, as well as other anionic counter ions; imidazoline derivatives; amine oxides of a cationic nature (e.g., at an acidic pH), and mixtures thereof.

In certain embodiments, useful cationic surfactants are selected from the group consisting of tetralkyl ammonium, trialkylbenzylammonium, alkyl amine oxides, and alkylpyridinium halides, and mixtures thereof.

Suitable amphoteric surfactants include those having tertiary amine groups, which may be protonated, as well as quaternary amine containing zwitterionic surfactants. Specific examples of such amphoteric surfactants include ammonium carboxylate amphoterics, such as alkyl betaines, as well as ammonium sulfonate amphoteric surfactants which are often referred to as "sultaines" or "sulfobetaines".

Exemplary nonionic surfactants include, but are not limited to, alkyl glucosides, alkyl polyglucosides, silicone copolyols, polyhydroxy fatty acid amides, sucrose esters, esters of fatty acids and polyhydric alcohols, fatty acid alkanolamides, ethoxylated fatty acids, ethoxylated aliphatic acids, ethoxylated fatty alcohols such as for example octyl phenoxy polyethoxyethanol and nonyl phenoxy poly(ethyleneoxy)ethanol, ethoxylated and/or propoxylated aliphatic alcohols, ethoxylated glycerides, ethoxylated/propoxylated block copolymers, ethoxylated cyclic ether adducts, ethoxylated amide and imidazoline adducts, ethoxylated amine adducts, ethoxylated mercaptan adducts, ethoxylated condensates with alkyl phenols, ethoxylated nitrogen-based hydrophobes, ethoxylated polyoxypropylenes, polymeric silicones, fluorinated surfactants, and polymerizable (reactive) surfactants such as alkylene polyalkoxy sulfate.

It will be understood that certain compounds in the paint curing treatment formulation may serve more than one function. For example, certain compounds may serve as both a polycationic paint drying compound and as a humectant, or as both a paint drying compound and as a surfactant. For the purposes of this disclosure, if a particular compound is polycationic, it is considered to be part of the paint drying compound(s).

The surface layer may include other optional additives such as corrosion inhibitors, buffers, dyes, pigments, emulsifiers, antioxidants, viscosifiers (i.e. thickeners), additional solvents, plasticizers, and/or preservatives.

According to another method of the invention, a liquid composition containing a paint curing treatment is applied to at least one surface face of the drop cloth. This may be accomplished using a number of techniques including roll coating, pad coating, spraying, and vapor depositing a composition comprising a paint curing treatment on at least one surface face of the drop cloth. Vapor deposition may include the vapor phase deposition of a low molecular weight cationic material, the vapor phase deposition and polymerization of a cationic monomer, or ammonia plasma treatment that place amines directly on the surface face of the drop cloth. The paint curing treatment may also be applied manually to the surface face of the drop cloth using, for example, a sponge or other suitable applicator.

According to another method, a liquid paint curing treatment composition may be applied to the surface face of the drop cloth, immediately prior to use. For example, the liquid paint curing treatment composition may be applied via a liquid impregnated applicator pad. In this embodiment, a kit including at least the drop cloth and a paint curing treatment composition may be supplied. Alternatively, still, the liquid paint curing treatment composition may be sold separately (i.e. separate from the drop cloth), whereby an end user can apply the composition to at least one surface face of the drop cloth prior to use.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. Implementation of the techniques, blocks, steps and means described above may be done in various ways.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A sheet comprising:
 a flexible substrate having lateral dimensions substantially larger in each direction than its thickness and having a top surface and a bottom surface; wherein
 the flexible substrate is formed from a single layer of a polymer blend comprising at least two different polymeric materials;
 a first polymeric material of the at least two different polymeric materials supports a first aspect of the performance of the sheet;
 a second polymeric material of the at least two different polymeric materials supports a second aspect of the performance of the sheet;
 the first aspect of the performance of the sheet is one of enhanced adhesion of a solidified form of a liquid employed in coating surfaces to the sheet and absorption of a component of the liquid employed in coating surfaces when in contact with the sheet; and
 the polymer blend comprises:
  a polyethylene mixture comprising a portion formed from a high density polyethylene (HDPE) and another portion formed from a low density polyethylene (LDPE); and
  an elastomer.

2. The sheet according to claim 1, wherein
the second aspect of the performance of the sheet is a different aspect to the first aspect of the performance of the sheet and is one of enhanced adhesion of a solidified form of a liquid employed in coating surfaces to the sheet, enhanced adhesion of the flexible substrate to a surface upon which it is deployed, and absorption of a component of the liquid employed in coating surfaces when in contact with the sheet.

3. The sheet according to claim 1, wherein
the liquid is paint.

4. The sheet according to claim 1, wherein
the polymer blend further comprises a plurality of nanoparticles of one or more predetermined materials which induced at least one of morphology refinement, coarsening, formation of irregularly shaped domains, promotion of co-continuity, and morphology stabilization during the fabrication of the sheet.

5. The sheet according to claim 1, further comprising
a plurality of nanoparticles of one or more predetermined materials.

6. The sheet according to claim 1, wherein
at least one of:
  the polymer blend further comprises a plurality of nanoparticles of one or more predetermined materials which induced at least one of morphology refinement, coarsening, formation of irregularly shaped domains, promotion of co-continuity, and morphology stabilization during the fabrication of the sheet; and
  a plurality of nanoparticles of one or more predetermined materials.

7. The sheet according to claim 1, wherein
the polymer blend further comprises at least one of a block copolymer and a graft copolymer.

8. The sheet according to claim 1, further comprising:
a third polymeric material added to the polymer blend, wherein the third polymeric material is a super-absorbent polymer.

9. The sheet according to claim 1, wherein
the elastomer is selected from the group comprising ethylene propylene diene monomer (EPDM); thermoplastic polyolefin (TPO); poly(styrene-butadiene-styrene) (SBS); and styrene-ethylene-butylene-styrene (SEBS).

10. The sheet according to claim 1, wherein
the polyethylene mixture is 50% of the polymer blend and the elastomer is 50% of the polymer blend.

11. The sheet according to claim 1, wherein
the elastomer is selected from the group comprising ethylene propylene diene monomer (EPDM); thermoplastic polyolefin (TPO); poly(styrene-butadiene-styrene) (SBS); and styrene-ethylene-butylene-styrene (SEBS); and
the polyethylene mixture is 50% of the polymer blend and the elastomer is 50% of the polymer blend.

12. The sheet according to claim 1, wherein
a first side of the flexible substrate has a plurality of first embossed structures;
a second side of the flexible substrate has a plurality of second embossed structures;
the plurality of first embossed structures and the second plurality of first embossed structures increase the surface area of the flexible substrate to increase the first aspect of the performance of the flexible sheet.

13. The sheet according to claim 1, wherein
the flexible sheet further comprises a super-absorbent polymer (SAP);
the first aspect of the performance of the flexible sheet is enhanced adhesion of the solidified form of the liquid employed in coating surfaces to the sheet;
the second aspect of the performance of the flexible sheet is enhanced adhesion of the flexible substrate to a surface upon which it is deployed; and
the SAP absorbs a component of the liquid employed in coating surfaces when in contact with the sheet.

14. A sheet comprising:
a flexible substrate having lateral dimensions substantially larger in each direction than its thickness and having a top surface and a bottom surface; wherein
the flexible substrate is formed from a single layer of a polymer blend comprising at least two different polymeric materials;
a first polymeric material of the at least two different polymeric materials supports a first aspect of the performance of the sheet;
a second polymeric material of the at least two different polymeric materials supports a second aspect of the performance of the sheet;
the first aspect of the performance of the sheet is one of enhanced adhesion of a solidified form of a liquid employed in coating surfaces to the sheet and absorption of a component of the liquid employed in coating surfaces when in contact with the sheet;
the flexible substrate comprises a repeating sequence of first regions and second regions;
each first region extends from a first side of the flexible substrate to a second side of the flexible substrate and is formed from the first polymeric material; and
each second region extends from the first side of the flexible substrate to the second side of the flexible substrate and is formed from the second polymeric material.

15. The sheet according to claim 14, wherein
the first side of the flexible substrate has a plurality of first embossed structures;
the second side of the flexible substrate has a plurality of second embossed structures; and
the plurality of first embossed structures and the second plurality of first embossed structures increase the surface area of the flexible substrate.

16. The sheet according to claim 14, wherein
the first side of the flexible substrate has a plurality of first embossed structures;
the second side of the flexible substrate has a plurality of second embossed structures; and
at least one of:
  the plurality of first embossed structures and the second plurality of first embossed structures increase the surface area of the flexible substrate to increase the first aspect of the performance of the flexible sheet; and
  the plurality of first embossed structures and the second plurality of first embossed structures increase the surface area of the flexible substrate to increase the second aspect of the performance of the flexible sheet.

17. The sheet according to claim 14, wherein the polymer blend comprises:
a polyethylene mixture comprising a portion formed from a high density polyethylene (HDPE) and another portion formed from a low density polyethylene (LDPE); and
an elastomer.

18. The sheet according to claim 14, wherein
the second aspect of the performance of the sheet is a different aspect to the first aspect of the performance of the sheet and is one of enhanced adhesion of a solidified form of a liquid employed in coating surfaces to the sheet, enhanced adhesion of the flexible substrate to a surface upon which it is deployed, and absorption of a component of the liquid employed in coating surfaces when in contact with the sheet.

19. The sheet according to claim 14, wherein
the polymer blend further comprises at least one of a block copolymer and a graft copolymer.

20. The sheet according to claim 14, further comprising:
a third polymeric material added to the polymer blend, wherein the third polymeric material is a super-absorbent polymer.

* * * * *